United States Patent [19]
Wagstaff

[11] Patent Number: 6,036,351
[45] Date of Patent: Mar. 14, 2000

[54] ADVANCED SIGNAL PROCESSING FILTER

[75] Inventor: Ronald A. Wagstaff, Slidell, La.

[73] Assignee: The United States of America as represented by the Secretary of the Navy, Washington, D.C.

[21] Appl. No.: 08/314,281

[22] Filed: Sep. 30, 1994

[51] Int. Cl.[7] ........................... G06F 17/10
[52] U.S. Cl. ........................ 364/724.18; 367/901
[58] Field of Search .............. 364/724.18, 724.01; 367/901; 342/196

[56] References Cited

U.S. PATENT DOCUMENTS

| | | | |
|---|---|---|---|
| 4,207,624 | 6/1980 | Dentino et al. | 364/724.18 |
| 5,103,431 | 4/1992 | Freeman et al. | 367/901 |
| 5,216,640 | 6/1993 | Donald et al. | 367/901 |

Primary Examiner—David H. Malzahn
Attorney, Agent, or Firm—Thomas E. McDonnell; Edward F. Miles

[57] ABSTRACT

A filter, and method of the filtering, for increasing the signal to noise ratio of relatively small and constant amplitude signals in the presence of relatively large and varying amplitude signals. The filter produces a filtered power level $a_z$ proportional to:

$$a_z = \left(\sum_{i=1}^{N} x_i^{-z}\right)^{-\frac{1}{z}}$$

where $x_i$ are power realizations of the signal in a selected frequency bin, and i=1, 2, . . . , N, and z is a non-zero real number not equal to −1, 0, or 1, and is preferably positive. For positive z, because filtered power level $a_z$ depends on a sum of $(x_i)^{-z}$, sum $a_z$ disproportionately favors smaller, more stable, signals.

20 Claims, 8 Drawing Sheets

| EXAMPLE NO. | SEQUENCE | FLUCTUATION SIZE | AVERAGE* ($A_{-1}$) | WISPR** ($A_{+1}$) | $AWSUM_2$ ($A_2$) | $AWSUM_4$ ($A_4$) |
|---|---|---|---|---|---|---|
| 1. | 50, 55, 45, 60, 47, 43 | SMALL (SIGNAL) | 50 | 49.34 | 49.03 | 48.46 |
| 2. | 50, 80, 20, 75, 35, 40 | MODERATE (NOISE) | 50 | 40.16 | 35.82 | 29.88 |
| 3. | 50, 800, 20, 75, 35, 40 | MODERATE +IMPULSE | 170 | 43.43 | 36.43 | 29.91 |

*AVERAGE = $AWSUM_{-1}$
**WISPR = $AWSUM_1$

FIG. 2

ADVANCED SIGNAL PROCESSING FILTER

BACKGROUND

A conventional way to increase the signal to noise ratio of a signal in the frequency domain is to average power realizations of the signal in each frequency bin. For example, a signal in the time domain is sampled, and these time samples transformed in an N point fast Fourier transform into a plurality of frequency bins having N points each. Each of the N points in each frequency bin is then averaged, which typically increases the signal to noise ratio in each bin because noise data sums less coherently than signal data. This can be formulated as:

$$a = \sum_{i=1}^{N} x_i$$

where a is average signal in the particular frequency bin, $x_i$ is the ith point, or realization, of the frequency bin, i=1, 2, ..., N. However, this approach often proves insufficient in noise environments in which the desired signal is relatively small and steady, but is buried in noise signals which have relatively large temporal amplitude fluctuations. An example of this would be tonals from an underwater acoustic source. Interactions at the surface, such as from weather or from ships on the surface, or impulsive noise such as encountered in the arctic, produce large amplitude, short lived, noise which can bury such underwater signals. These noise signals can be so large that conventional means of detecting the underwater signals, such as the power averaging above, frequently prove ineffective. A similar situation is created by a signal jammer, which outputs intermittent large amplitude signals in order to overwhelm smaller, more constant, signals of interest. Application Ser. No. 07/772,275 by the same inventor, discloses the following improvement over the above straightforward average:

$$a' = \left(\frac{1}{N}\sum_{i=1}^{N} x_i^{-1}\right)^{-1}$$

Because the sum depends on $1/x_i$, rather than $x_i$, a' disproportionately attenuates large signals, and thus will improve the signal to noise ratio of relatively small underwater acoustic signals. Although an improvement over straightforward averaging, even more sensitive filters would be useful. Moreover, not all noise environments require the same amount of filtering to produce useful results. It would also be helpful to permit control filter sensitivity by adjusting filter parameters.

SUMMARY OF THE INVENTION

Accordingly, an object of the invention is to increase the signal to noise ratio of signals output from a spectrum analyzer in which the noise has temporal amplitude fluctuations that are greater than the amplitudes of the temporal fluctuations of the signal.

Another object is to permit detection in the presence of noise of tonals whose amplitudes are too small to be detected with conventional filters.

Another object is to permit adjustment of filter sensitivity by adjustment of filter parameters.

Another object is to permit determination of whether a low amplitude signal is from a submerged source.

Another object is to reduce clutter in undersea sonar systems by attenuating active reflections from targets on the ocean surface, such as ships, more than signals from undersea targets.

Another object is to permit countering of jamming of a low amplitude tonal with high amplitude intermittent jamming signals.

In accordance with these and other objects made apparent hereinafter, the invention broadly pertains to a filter and method of using the filter, in which the filter receives a time series $x_i$ of power realizations, i=1, 2, ..., N, selects an parameter z for the filter, in which z is a real number not equal to −1, 0, or 1, and determines $a_z$, according to:

$$a_z = \left(\frac{1}{N}\sum_{i=1}^{N} x_i^{-z}\right)^{-\frac{1}{z}}$$

Because the sum depends exponentially on the inverse of the $x_i$'s, the magnitude of $a_z$ depends disproportionately on the smaller $x_i$'s, the amount of dependence increasing as z increases. This permits greater filtering, and better resultant signal to noise ratio of smaller relatively stable signals, than simple averaging, or the filter of application Ser. No. 07/772, 275. Moreover, by judiciously selecting z, one can control the degree of filtering so as to fit the filter to any desired application. Although the filter is motivated by a desire to attenuate out large amplitude signals, and thus one would naturally want to select only positive values of z, one could nonetheless use the filter with negative values of z to disproportionately filter out small signals.

These objects, features, and advantages of the invention, as well as others made apparent hereinafter, are best understood from the following detailed description of particular embodiments. However, the invention is capable of extended application beyond the details of these embodiments, which one can change and modify without escaping the spirit and scope of the invention, as expressed in the appended claims. The embodiments are described with reference to the accompanying drawings, wherein:

BRIEF DESCRIPTION OF THE DRAWINGS

FIG. 2 is a table of data exemplifying operation and advantages of the invention.

DETAILED DESCRIPTION

Figure 1:
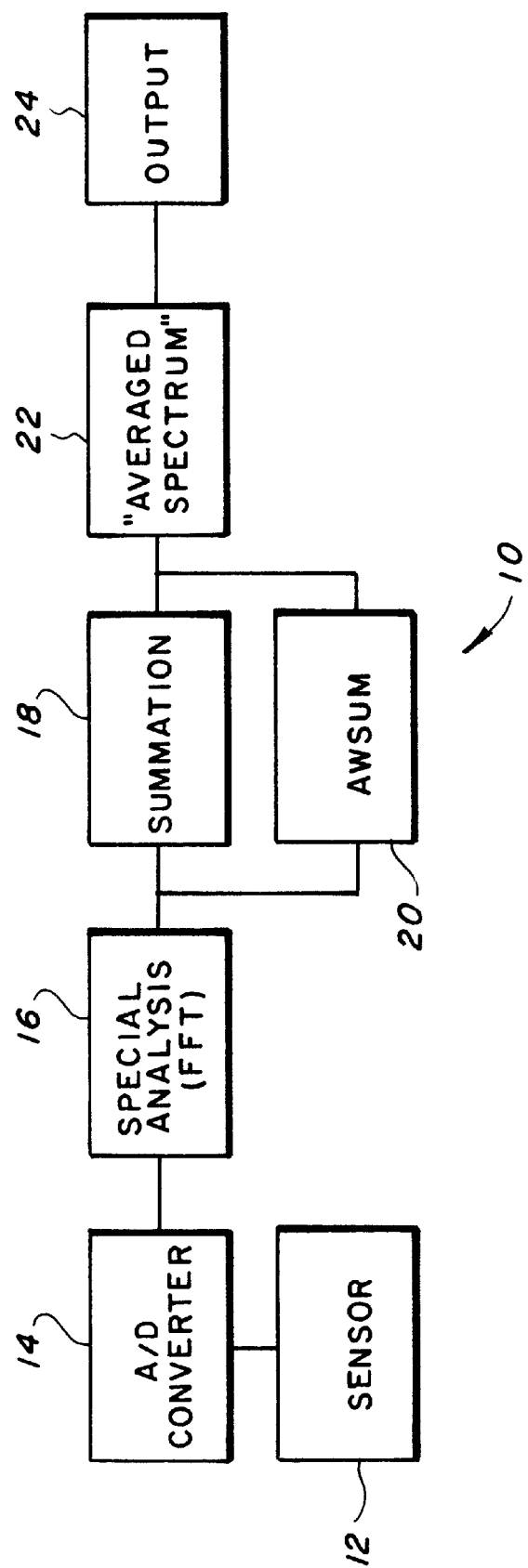
FIG. 1 is a block diagram illustrating practice of an embodiment according to the invention.

With reference to the drawing figures, and in particular FIG. 1, system 10 is an arrangement of hardware useable to practice the invention. A sensor 12 receives a stream of data in the time domain, for example that from a sonobuoy at sea, which is digitized by A/D converter 14, and transformed into the frequency domain by spectrum analyzer 16, which could employ a conventional fast Fourier transform (FFT) with an N point transform. Spectrum analyzer 16 produces for each frequency bin of interest a series of signals $x_i$, $1=1, 2, \ldots$, N corresponding to signal power at the frequency of the bin (i.e. within the frequency increment spanned by the bin) at the time each $x_i$ was sampled. These signals, for a given frequency bin, could be averaged, as discussed above, by summer 18 to produce an average spectrum at 22. Preferably the samplewise sum is done at 20 according to:

$$a_z = \left(\frac{1}{N}\sum_{i=1}^{N} x_i^{-z}\right)^{-\frac{1}{z}}$$

where z is a real number not equal to zero, the value of which is preferably a selectable filter parameter. This modified sum is presented at 22, and thence to 24 for further processing. One can express $a_z$ alternatively in decibels as:

$$A_z = -\frac{10}{z}\log_{10}\left(\frac{1}{N}\sum_{i=1}^{N} 10^{-\frac{zY_i}{10}}\right)$$

according to the transform $Y_i = 10\log_{10}(x_i)$ and $A_z = 10\log_{10}(a_z)$.

The advantages of this modified sum are seen by inspection. Because the sum depends on $x_i^{-z}$, for z positive $a_z$ will depend disproportionately on smaller values of $x_i$, i.e. on smaller signals, and this disproportion increases with z. Parameter z can have any non-zero value, although positive ones are most preferable because negative values will cause large signals to be favored, rather than small signals. One can also see that simple conventional averaging of the $x_i$'s is a special case in which $z=-1$, and the filter of application Ser. No. 07/772,275 is a special case in which $z=+1$. If no noise whatsoever is present, then in the presence of a stable tonal each $x_i$ equals the same constant value x, and $a_z$ will equal x for all non-zero values of z.

FIG. 2 presents three examples illustrating operation of the filter. Each of the three examples has six power realizations, $x_i$, $i=1, 2, \ldots, 6$, for a hypothetical frequency bin, and estimates signal power according, respectively, to conventional averaging, the filter of application Ser. No. 07/772,275, the invention with $z=2$, and the invention with $z=4$. The first example shows very little variation among the six power realizations, and represents a signal with small amplitude fluctuations. As FIG. 1 indicates, a conventional average of these realizations ($a_{-1}$) produces a signal measure of 50 units. The filter of application Ser. No. 07/772,275 ($a_{+1}$) produces a slightly lower estimate, 49.34. Filters according to the invention, with $z=2$ and 4 produce yet lower estimates, 49.03 and 48.46 respectively. Thus when the amplitude fluctuations are small the various filter realizations of the invention provide output powers only slightly attenuated relative to the output of conventional averaging, or the filter of application Ser. No. 07/772,275.

The second example in FIG. 2 shows six values of $x_i$, in which the fluctuations in the power amplitudes are larger than in the previous example of FIG. 2, and are considered moderate fluctuations. Conventional averaging produces a signal estimate of 50; the filter of application Ser. No. 07/772,275 produces a lower estimate of 40.16. The two filters according to the invention produce lower estimates, 34.82 and 29.88 respectively.

If one considers the signal to be represented by the first example in FIG. 2 and the surrounding noise to be represented by the second example in FIG. 2, the signal-to-noise ratio for the conventional averaging is 0.0 dB, i.e. 10 $\log_{10}(50/50)$, and for the filter of application Ser. No. 07/772,275 is 0.89 dB, i.e. 10 $\log_{10}(49.34/40.16)$. The two filters according to this invention for z values of 2 and 4 give respectively 1.36 dB, i.e. 10 log(49.03/35.82) and 2.10 dB i.e. 10 $\log_{10}(48.46/29.88)$.

The third example is similar to example 2, having moderate signal amplitude fluctuations but also with a very large impulse (power=800). Here, a conventional average produces the very bad estimate of 170 that is strongly biased high. The filter of application Ser. No. 07/772,275 produces a much lower estimate, 43.43. The filters according to the invention again produce the best, least biased, results: 36.43 and 29.91.

A measure of the robustness of the various filters to spurious impulses is the difference between the average for the data sequence without the impulse and the data sequence with one impulse. For conventional averaging it is 102 power units, i.e. 170–50; for the filter of application Ser. No. 07/772,275, it is 3.27, i.e. 43.43–40.16. The two filters according to the invention gave respectively 0.61, i.e. 36.43–35.82, and 0.03, i.e. 29.91–29.88, for $z=2$ and $z=4$. These results demonstrate the increased robustness of the two filters according to the invention.

Figure 3A:
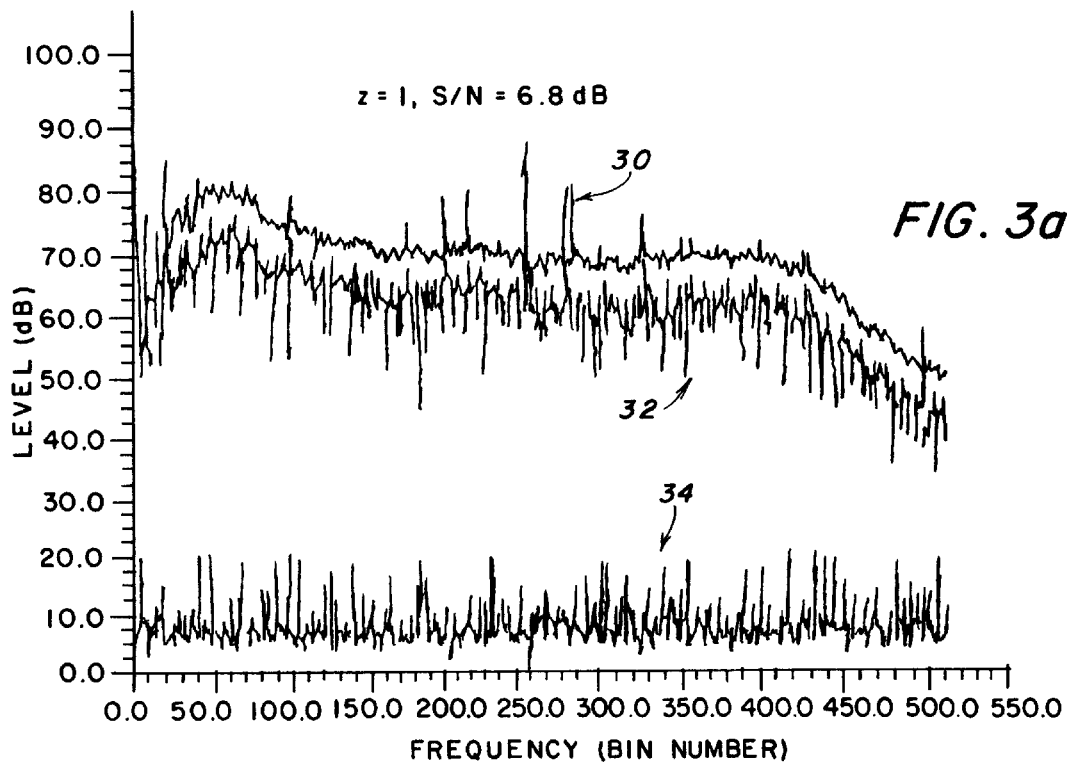
FIGS. 3*a* through 3*d* are graphs of raw and reduced data further illustrating aspects and advantages of the invention.

FIG. 3a illustrates the results of applying the invention to data taken from a sonobuoy in the presence of a submerged acoustic source. The curve is a plot of signal level in decibels as a function of bin frequency, with the bins assigned numbers rather than frequency. Curve 30 is that of the frequency spectrum obtained from power averaging 45 power realizations (N=45) gotten by a fast Fourier transform when the inputs to the FFT have been overlapped 50% relative to the previous input. Middle curve 32 is the same data processed by a filter according to application Ser. No. 07/772,275. Bottom curve 34 is the difference of the two curves. Averaging curve 30 shows a number of tonal peaks, e.g. at about bin numbers 10, 20, 200, 210, 250 and a pair at about 275. Difference curve 34 nears zero at only about bin numbers 10, 200 and 250, indicating the presence of tonals at the frequencies corresponding to these bins which are disproportionately unattenuated by the filter which produced curve 32. Curve 32 (z=1) is an average of 7.8 db attenuated from curve 30. However at the three tonals 10, 200, 250, curve 32 is only an average of 1 db down. Thus the average signal to noise ratio gain for these tonals of the filter according to application Ser. No. 07/772,275 is about 6.8 db better than conventional averaging. Because these three tonals have very small attenuation compared to other frequency bins, this indicates that they have not interacted with the sea surface, where they would be amplitude modulated by the moving, irregular, surface. Hence it can be inferred that the tonals must be from sources which are submerged. The other tonals are either from sources at the surface (e.g. ships), or are unsteady tonals from a submerged source.

Figure 3B:
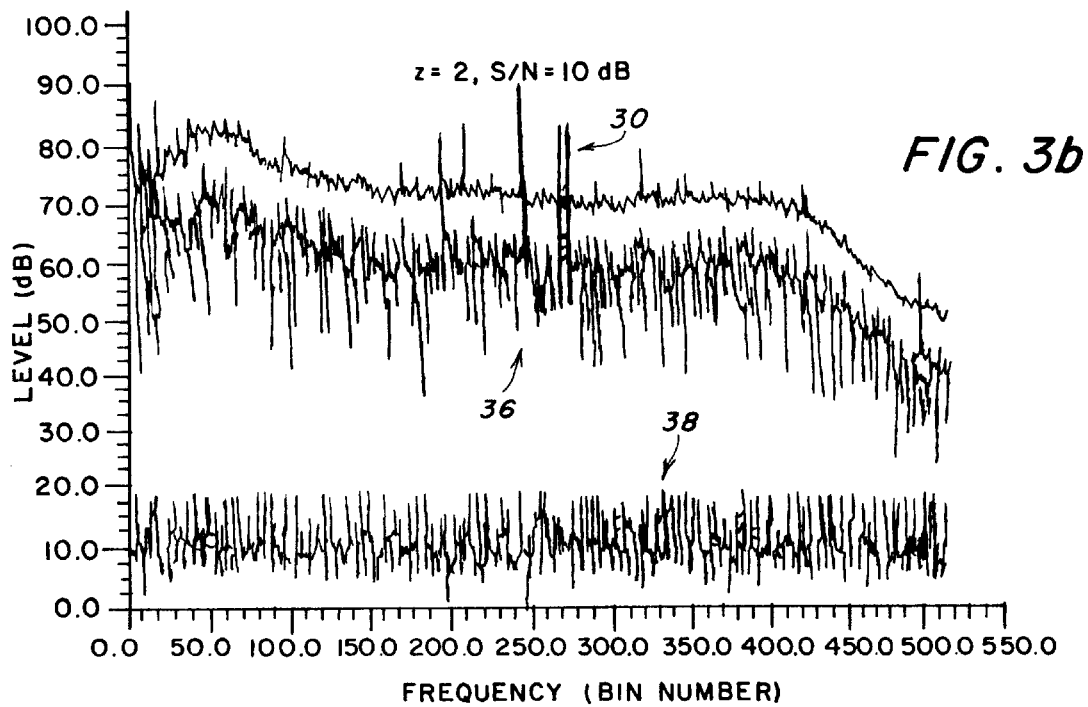
Figure 3C:
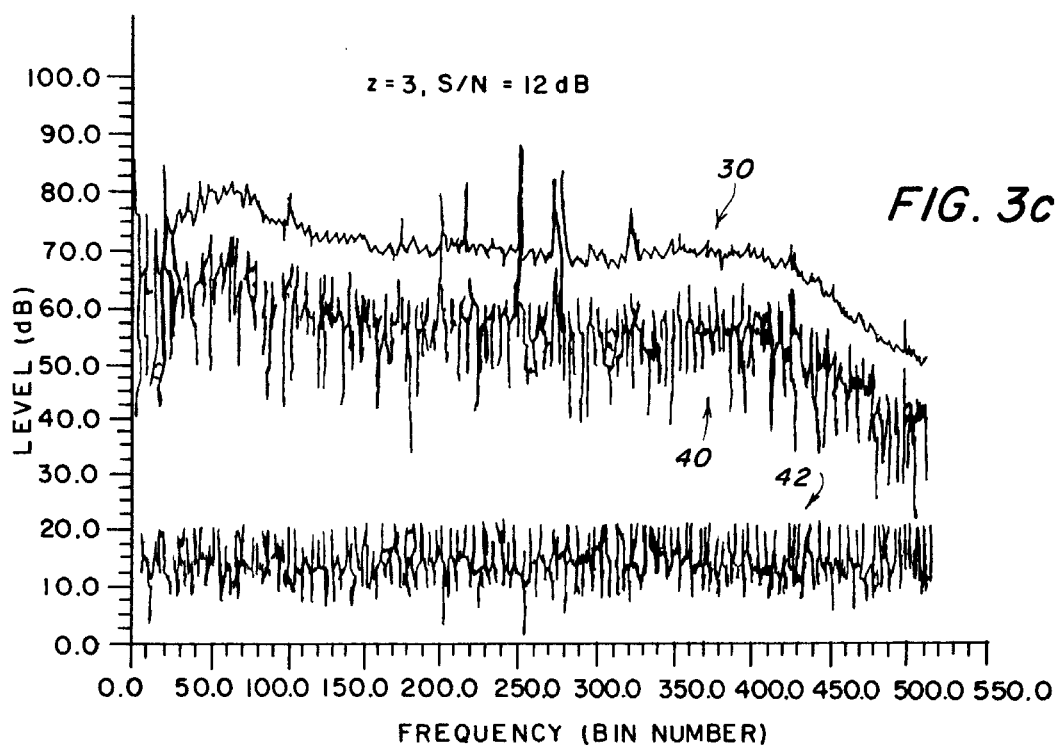
Figure 3D:
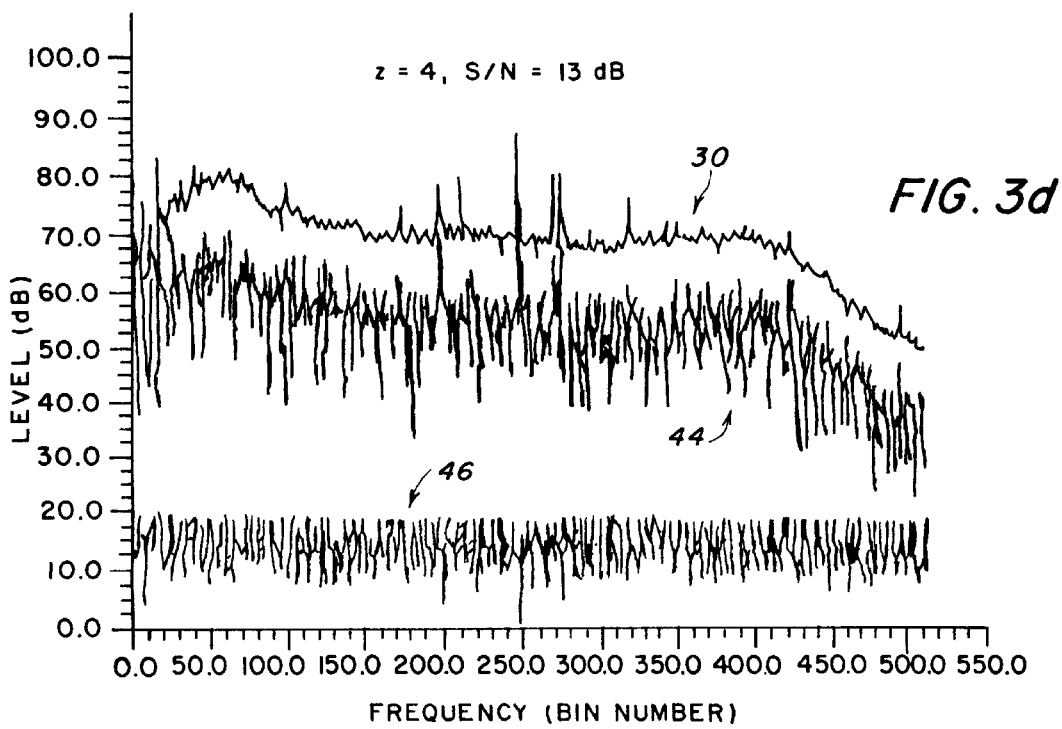

FIGS. 3b, 3c, and 3d are similar presentations of data as in FIG. 3a, but for filters according to the invention with respective z values of 2, 3, and 4, and the data output from those filters in respective curves 36, 40 and 44. The differences between these curves and conventional averaging (curve 30) are shown in respective curves 38, 42, and 46. (The tops of curves 38, 42, and 46 are cropped for clarity.) As with the curves in FIG. 3a, each of these sets of curves presents plural tonals, in the same frequency bins, and the difference curves continue to indicate tonals at about frequency bins 10, 200, 250. The difference among these curves is that as z increases from FIG. 3a to FIG. 3d, the signal to noise ratio of the tonals at bin number 0, 200, and 250 increases steadily from 6.8 db better than conventional averaging, to 10 db, to 12 db, and finally 13 db. This suggests that for relatively constant, unperturbed, tonals which one would expect from submerged acoustic sources one can get the signal to noise one wishes simply by a judicious selection of z.

Figure 4:
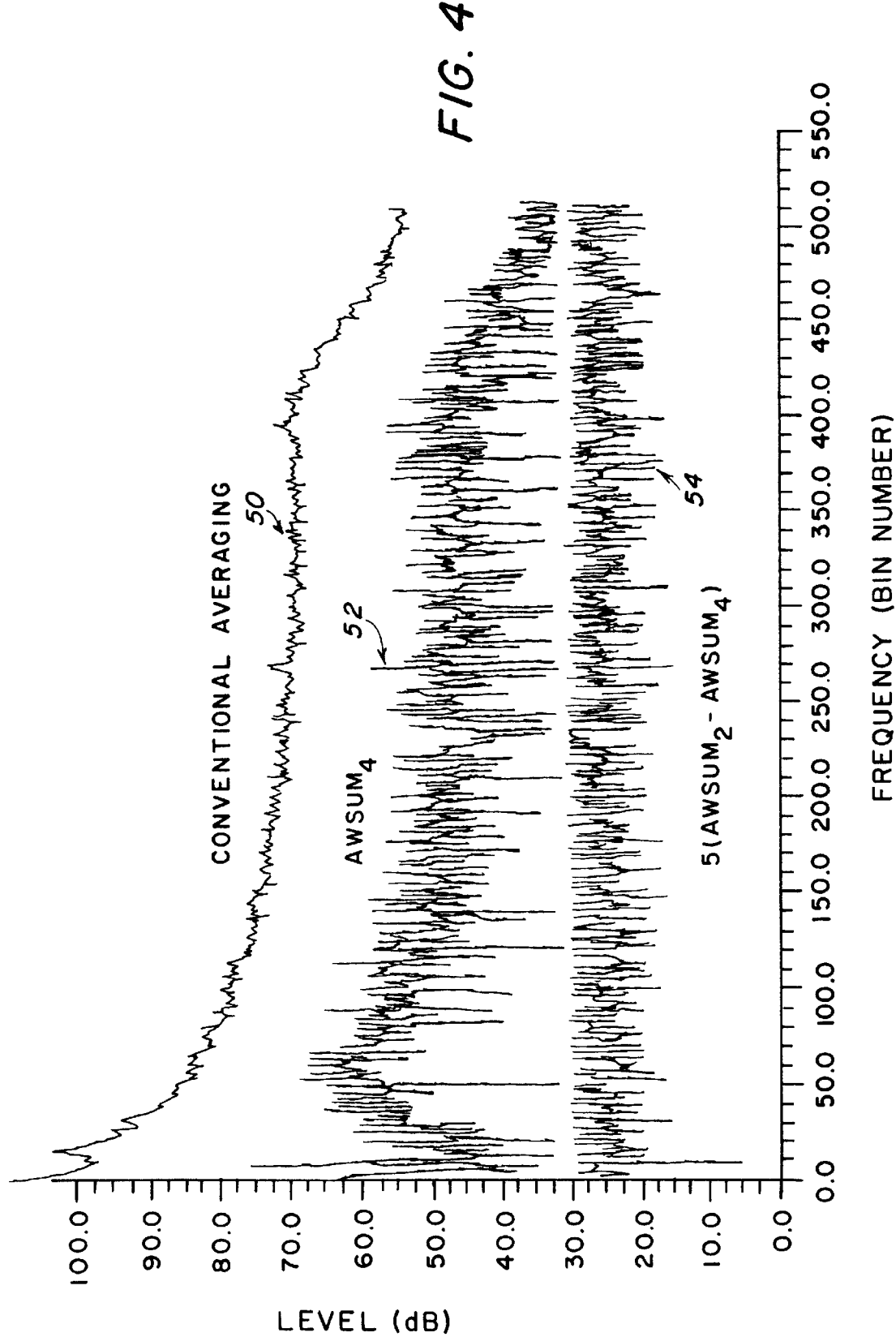
FIG. 4 is a graph similar to those of FIG. 3.

This is further illustrated in FIG. 4, a plot similar to that of FIGS. 3, but of data from a sonobuoy which was measured only intermittently, causing data overloads which proved too frequent for power averaging (curve 50) to yield useful results. Indeed no tonal peaks are at all apparent in curve 50. (Curve 50 is the data from a 300 point average with 95% FFT overlap.) Middle curve 52 is the same data filtered according to the invention, with z=4. Tonal peaks now appear and are numerous. Lower curve 54 is the difference of the data in curve 50 filtered by the invention with z=2 and 4, respectively. This produces only one near zero crossing, at about bin number 10, indicating the presence of a stable tonal at the corresponding frequency. Thus filters according to the invention can usefully extract information from data which would hitherto have been thought useless.

Figure 5:
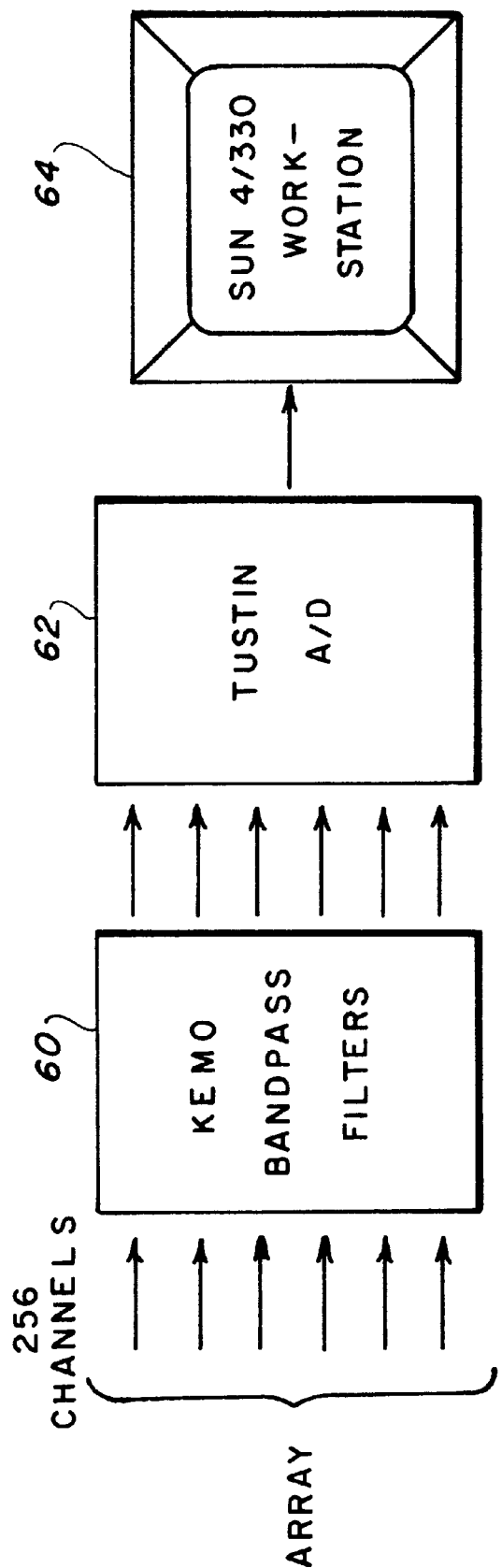
FIGS. 5*a* through 5*d* are graphs similar to those of FIGS. 3 and 4, which illustrate use of the invention with the output of beamformers.

FIG. 5 shows an embodiment of the invention for use with output from a coherent beamformer. Output from the elements of the beamformer (e.g. 256 elements in FIG. 5) are fed into a conventional bandpass filter 60 and digitized in A/D converter 62. Processor 64, for example a computer workstation, reduces the digitized data, and forms the system's beams in the conventional manner. Here, it is assumed that the array is tuned to one frequency, but that spurious data (e.g. ambient noise data) with large temporal amplitude variations occur in different look angles. Thus the power samples upon which the filter operates are power levels as a function of beam number θ, rather than power level as a function of frequency. Clutter signals in the same beam number having large amplitude variation will be disproportionately attenuated, just as clutter signals in the same frequency bins were attenuated in the above embodiments, leaving the enhanced signal-to-noise ratio signal at the beam number θ corresponding to the direction from which relatively stable signals come from. This is especially important for overcoming hostile jamming, which frequently takes the form of intermittent large power bursts.

Figure 6A:
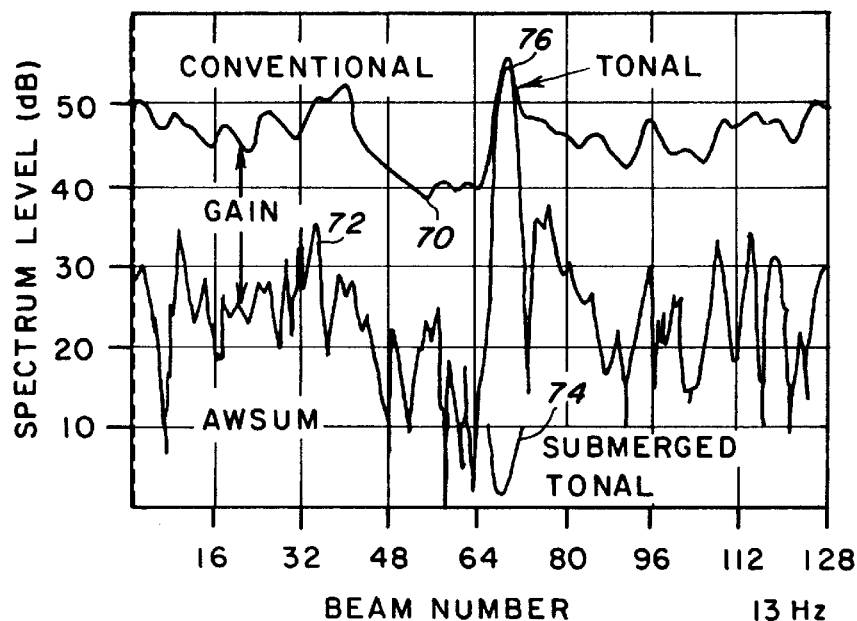
FIG. 6 is a block diagram illustrating another embodiment of the invention, which processes data from a coherent beamformer.
Figure 6B:
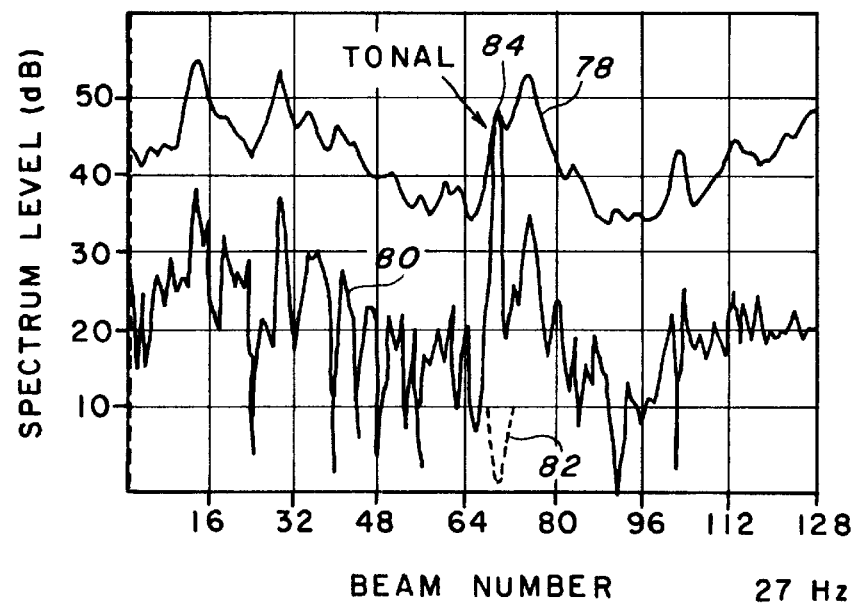
Figure 6D:
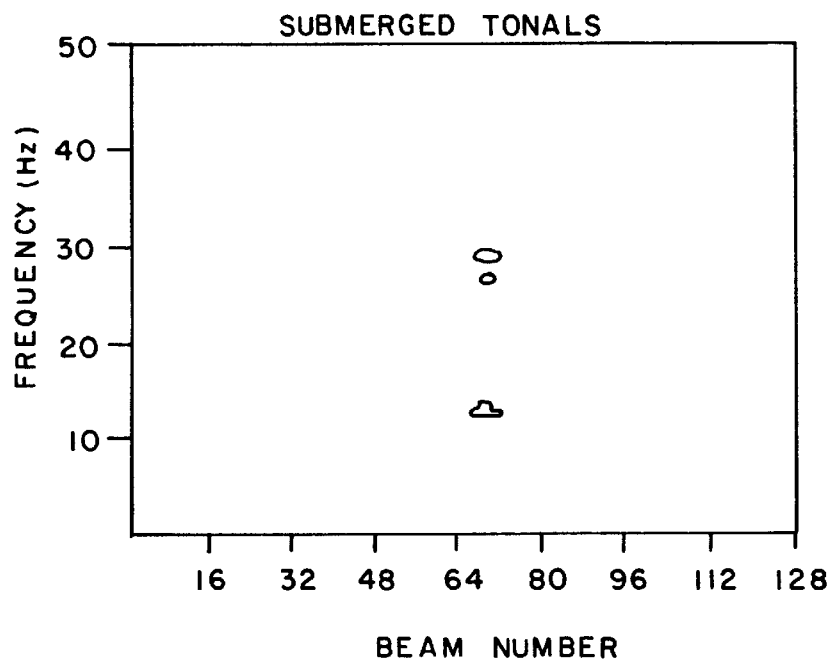
Figure 6C:
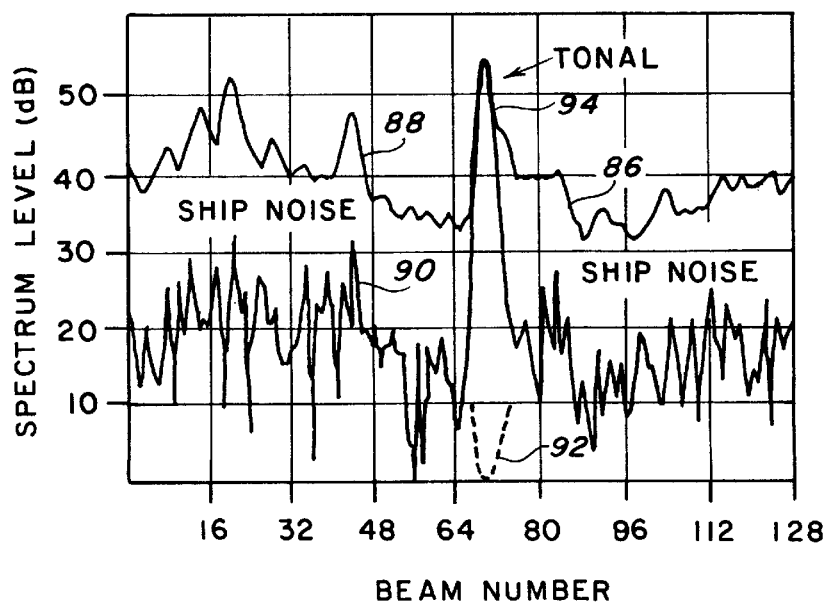

FIGS. 6a through 6d show results of a test performed with data from such a beamformer, and a filter according to the invention of order z=4. To produce the data of these figures, three submerged acoustic projectors generated respective test tonals at about 13, 27, and 29 Hz respectively, in the presence of about 400 points of noise in each corresponding frequency bin. FIGS. 6a through 6c plot power level as a function of beam number for the three test frequencies. Curves 70, 78, 86 are the data in the respective test bins filtered by conventional averaging. Curves 72, 80, 90 are the data in the respective test frequencies filtered by the invention with z=4. Curves 74, 82, and 92 represent the differences between conventional averaging and the filter according to the invention for the respective test frequencies. Difference curves 74, 82, 92 are truncated above 10 dB for clarity. Because filter attenuation should be least at a tonal difference curves 74, 82, 92 should be smallest (indeed, near zero) at beam numbers corresponding to the direction of tonal sources. Each curve 74, 82, 92 is, in fact, near zero at about beam number 68, i.e. in the direction of the acoustic projector.

FIG. 6d is a threshold crossing plot (designated submerged tonals) that shows the beam-frequency bins from the beamformer outputs for which the corresponding differences are less than 1.5 dB. (This cutoff is arbitrary, but is sufficiently close to zero to give a high degree of confidence that the source is submerged.) The threshold crossing plot has three points, one at each of the test frequencies, and each at beam number 68, indicating detection of a submerged acoustic source or sources in the direction of beam number 68, and radiating at about 13, 27, and 29 Hz. In this manner, one can use the invention to identify the presence and direction of submerged acoustic sources.

Beamformers of the kind illustrated in FIG. 6 conventionally use matched filters, which send and receive signals whose frequencies are time variant, and have the capability to process returns to the array into the form of power as a function of frequency, time, and look angle. Visualized graphically, these power data would constitute a contour in 4-space, as a function of the 3-space volume formed by f, t, and θ. Filters according to the invention lend themselves to removing large amplitude clutter from such a data base readily. The application of the filters is identical as discussed above; the difference is in how one selects the individual $x_i$ data.

To illustrate this, consider a radar array tracking a moving target with time varying frequency signals. Simple examples of such frequency varying signals would be chirped pulses, or ramped pulses. Thus as the tracking continues, f, t, and θ all are changing, tracing out a path in f-t-θ space as the track continues. The data one would select for the filter according to the invention would be the gain data corresponding to this path. Thus if both beam number θ and frequency f change linearly with time during the sweep, the path in f-t-θ space is a three dimensional plane, and the data values of the system corresponding to the points in this plane are the values of $x_i$. If one wished to search at only one frequency, then f would be constant and the plane would be parallel to the t-θ plane. If one wished to search in only one direction, then θ would be constant, and the plane would be parallel to the f-t plane, etc.

If one has analog data, rather than digital, one can filter according to the invention by integration, rather than summing, i.e.:

$$a_z = \left( \frac{1}{L_c} \int_c \frac{dv}{x^{-z}} \right)^{-\frac{1}{z}}$$

where x(θ,f,t) is a continuous function of power realizations, in f, θ, and t space, c indicates a preselected path in θ-f-t space, $L_c$ is the length of the path in this space, and dv is an increment in this space.

The foregoing describes what is considered to be the most practical and preferred embodiments of the invention. It is recognized, however, that obvious modifications to these embodiments may occur to those with skill in the art. Accordingly, the scope of the invention is to be discerned solely by reference to the appended claims, wherein:

I claim:

1. A filter, said filter comprising:
    means for receiving a time series $x_i$ of power realizations, i=1, 2, . . . , N;
    means for selecting an order z of said filter, said z a real number not equal to 0, 1, or −1; and
    means for determining $a_z$, wherein $a_z$ is proportional to:

$$\left( \sum_{i=1}^{N} x_i^{-z} \right)^{-\frac{1}{z}}.$$

2. The filter of claim 1, wherein:
    said means for receiving is further adapted effective to receive various ones of said time series at different frequencies such that each $x_i$ is at a frequency $f_i$, each $f_i$ is selected according to a preselected rule.

3. The filter of claim 2, wherein said rule is that each $f_i$ is the same.

4. The filter of claim 2, wherein said rule is that $f_i = kt_i$, wherein said k is a constant, and said $t_i$ is the time at which each corresponding $x_i$ is received.

5. The filter of claim 2, wherein said system comprises:
    means for receiving beamformer outputs to form a plurality of beamformer power realizations, each of said plurality of beamformer power realizations being a function of frequency f, time received t, and beam number; and means for forming said time series of power realizations by selecting those ones of said plurality of beamformer power realizations corresponding to the points in f, t, θ space corresponding to a preselected path in f, t, θ space.

6. The filter of claim 5, wherein said path is a path in which said θ is constant.

7. The filter of claim 1, wherein said z≧2.

8. A filter, said filter comprising:

means for receiving a substantially continuous power realization x(f,t,θ), f being the frequency of said realization x(f,t,θ), t being time of receipt of said realization x(f,t,θ), and θ being the beam number of said realization x(f,t,θ);

means for selecting an order z of said filter, said z being a real number not equal to 0, 1, or −1;

means for determining $a_z$, wherein:

$$a_z = \left(\frac{1}{L_c}\int_c \frac{dv}{x^{-z}}\right)^{-\frac{1}{z}}$$

wherein dv is an increment in f, t, θ space, $L_c$ is the length of a preselected path in said f, t, θ space, and the above listed integral over c is a path integral along said preselected path.

9. The filter of claim 8, wherein said θ is constant.

10. The filter of claim 8, wherein said z≧2.

11. A method of filtering, said method comprising:

receiving a time series $x_i$ of power realizations, i=1, 2, . . . , N;

selecting an order z of said filter, said z a real number not equal to 0, 1, or −1; and determining $a_z$, wherein:

$$a_z = \left(\frac{1}{N}\sum_{i=1}^{N} x_i^{-z}\right)^{-\frac{1}{z}}.$$

12. The method of claim 11, wherein said method further comprises:

receiving various ones of said time series at different frequencies such that each $x_i$ is at a frequency $f_i$, each $f_i$ is selected according to a preselected rule.

13. The method of claim 12, wherein said rule is that each $f_i$ is the same.

14. The method of claim 12, wherein said rule is that $f_i = kt_i$, wherein said k is a constant, and said $t_i$ is the time at which each corresponding $x_i$ is received.

15. The method of claim 12, wherein said system comprises:

receiving beamformer outputs to form a plurality of beamformer power realizations, each of said plurality of beamformer power realizations being a function of frequency f, time received t, and beam number; and forming said time series of power realizations by selecting those ones of said plurality of beamformer power realizations corresponding to the points in f, t, θ space corresponding to a preselected path in f, t, θ space.

16. The method of claim 15, wherein said path is a path in which said θ is constant.

17. The method of claim 11, wherein said z≧2.

18. A method, said method comprising:

receiving a substantially continuous field of beamformer power realizations x(f,t,θ), f being the frequency of said realization x(f,t,θ), t being time of receipt of said realization x(f,t,θ), and θ being the beam number of said realization x(f,t,θ);

selecting an order z of said method, said z being a real number not equal to 0, 1, or −1;

determining $a_z$, wherein:

$$a_z = \left(\frac{1}{L_c}\int_c \frac{dv}{x^z}\right)^{-\frac{1}{z}}$$

wherein dv is an increment in f, t, θ space, $L_c$ is the length of a preselected path in said f, t, θ space, and the above listed integral over c is a path integral along said preselected path.

19. The method of claim 18, wherein said θ is constant.

20. The method of claim 18, wherein said z≧2.

* * * * *